D. P. SHARP.

Horse Hay-Rake.

No. 8,668. Reissued April 8, 1879.

Witnesses.
E. B. Scott.
Louis Spahn.

Inventor.
Dennis P. Sharp,
per R. F. Osgood,
Atty.

N. PETERS, PHOTO-LITHOGRAPHER, WASHINGTON, D. C.

UNITED STATES PATENT OFFICE.

DENNIS P. SHARP, OF ITHACA, NEW YORK.

IMPROVEMENT IN HORSE HAY-RAKES.

Specification forming part of Letters Patent No. 41,326, dated January 19, 1864; Reissue No. 8,668, dated April 8, 1879; application filed July 20, 1874.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the same, reference being had to the accompanying drawings, in which—

Figure 1:
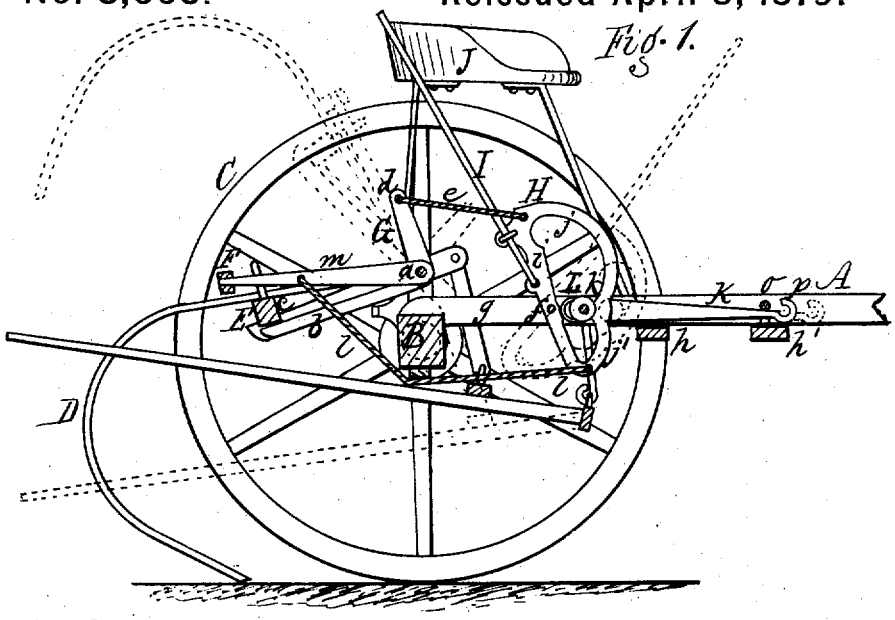
Figure 2:
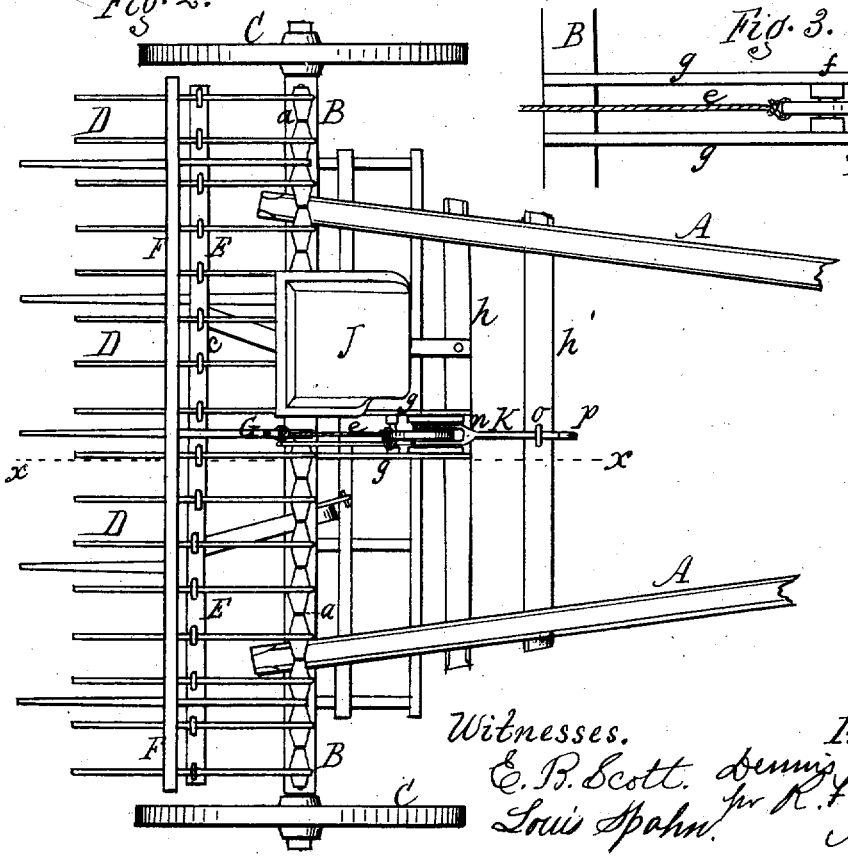
Figure 3:
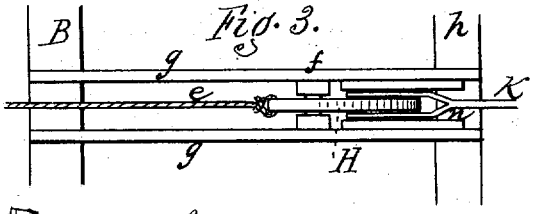

Figure 1 is a side sectional view of my invention, taken in the line *x x*, Fig. 2. Fig. 2 is a plan or top view of the same; Fig. 3, a detail view.

Similar letters of reference indicate correresponding parts in the figures.

This invention relates to a new and useful improvement in that class of horse-rakes in which wire teeth are used.

The invention consists in a novel way of connecting the draft attachment with the teeth, whereby the draft of the animal, by a simple manipulation on the part of the driver, is made subservient in elevating the teeth, so that the latter may discharge their load, also keeping the teeth elevated a requisite period of time, and the draft of the animal is also made to keep the teeth down while the latter are at work.

To this end my invention consists in the employment of a lever in connection with a central draft-rod and a connection to the teeth, whereby the elevating movement can be controlled by the operator; also, the employment of said lever in connection with a teeth-depressing frame, for holding the teeth down to their work; also, in the special construction of the lever in relation to the draft-rod; and, finally, in the use of two bars forming a bearing to the lever and its connections, all as hereinafter set forth.

To enable those skilled in the art to fully understand and construct my invention, I will proceed to describe it.

A represents the thills, B the axle, C the wheels, D the teeth, E the teeth-elevating frame, and F the teeth-depressing frame, of a wire-tooth horse-rake. These parts may be constructed in the usual way, and therefore do not require a minute description.

G represents a bent or right-angular lever, which is placed loosely on the shaft *a*, to which the rake-teeth D are secured. The lower arm, *b*, of this lever G extends underneath the bar *c* of the teeth-elevating frame E, and the upper end of the upper arm, *d*, of the lever G is connected by a cord or chain, *e*, with the upper end of a cam-shaped lever, H, the fulcrum *f* of which is between two parallel longitudinal bars, *g g*, the front ends of which are attached to the back cross-bar, *h*, of the thills A, the back ends being attached to the axle B. The form of the cam-shaped lever is shown clearly in Fig. 1. Its back part, *i*, is or may be a straight bar, while its front part has two curves, *j j'*, one above the other, the upper curve, *j*, approximating to a semi-ellipse, and being larger than the lower one, *j'*, which is of similar form. The two curved parts *j j'* are not in direct contact, a small semicircular concave, *k*, being between the two.

The fulcrum-pin *f* of the cam-shaped lever H passes through its back part, *i*, and to the latter there is attached a rod or handle, I, which extends upward by the side of the driver's seat J.

The lower end of the cam-shaped lever H is connected by a cord or chain, *l*, with an arm, *m*, of the teeth-depressing frame F, as shown in Fig. 1.

K is a rod or bar, the back end of which is divaricated or forked, as shown at *n*, to receive the front part of the cam-shaped lever H. In the back part of the fork *n* of the rod K there is a roller, L, said roller being within the lever H, and bearing against the back edge of its front side. The rod K passes through a guide, *o*, on the front cross-bar, *h'*, of the thills A, and it is bent in the form of a hook, *p*, at its front end, the hook receiving the staple of the whiffletree.

From the above description it will be seen that, as the machine is drawn along, the draft or pull of the animal will, when the roller L is in the lower curved part, *j'*, of the cam-shaped lever H, have a tendency to draw the lower end of the lever H forward and pull on the cord or chain *l*, which is connected to the teeth-depressing frame F, and thereby keep the teeth D pressed down to the earth. By slightly moving the upper end of the rod or handle I forward the roller L will catch into the concave *k*, and the lower ends of the teeth will be kept or retained a trifle above the surface of the ground. By shoving the upper end of the rod or handle I still farther forward the roller L will be within the upper curved part, *j*, of the lever H, and the draft or pull of the animal will draw forward the upper end of the lever H, which, in consequence of being connected by the cord or chain *e* with the upper arm, *d*, of the bent lever G, will raise the teeth-elevating frame E and the teeth D, as shown in dotted lines in Fig. 1. Thus, by simply actuating the rod or handle I and moving the cam-shaped lever H, the draft or pull of the animal is made subservient in raising the teeth to discharge the load, or in keeping the teeth down in proper working position.

The advantage of this arrangement consists in its extreme simplicity, there being no parts liable to become deranged by use, and it may be applied to the ordinary wire-tooth rakes at a small cost.

The two bars *g g*, connecting the cross-piece of the thills with the axle, serve not only to strengthen and brace said parts, but they also serve an important purpose as a bearing to inclose and hold in position the lever pivoted thereto. The lever, by being thus inclosed, is held firmly in place, and cannot twist or get disarranged under the great strain to which it is subjected, while it gets its bearing at a point where there is no other supporting part of the machine.

I do not claim, broadly, operating the teeth of a horse-rake by the draft movement irrespective of the means herein shown and described for that purpose; but I do claim as new and desire to secure by Letters Patent—

1. The cam-shaped lever H, provided with the two curves *j j'* and concave *k*, in combination with the central draft-rod K, as and for the purpose specified.

2. The combination, in a horse-rake, of the elevating and depressing frames E F, the levers G *m*, and connecting-cords *e l*, and the lever H, fulcrumed upon the draft-frame to elevate and depress the teeth D at the rear, substantially as specified.

3. The combination, in a mounted horse hay-rake, of a central draft-rod, an oscillating rake-head, and a lifting and depressing frame with a lever connected to the lifting and depressing frame at two points and upon which the draft-rod acts, the combination and arrangement being such that the draft can be applied to either lift or depress the rake-head at the will of the operator.

In witness whereof I have hereunto set my hand this 13th day of June, 1874.

DENNIS P. SHARP.

Witnesses:
R. M. WELLES,
A. D. LUCE.